United States Patent
Klingler et al.

(10) Patent No.: US 7,246,788 B2
(45) Date of Patent: Jul. 24, 2007

(54) ROLLER BELT CASSETTE FOR USE IN A CONTROL DEVICE

(75) Inventors: Dietrich Klingler, Heubach (DE); Werner Schwahn, Schwieberdingen (DE); Jürgen Otto, Illingen (DE)

(73) Assignee: Behr GmbH & Co. KG, Stuttgart (DE)

( * ) Notice: Subject to any disclaimer, the term of this patent is extended or adjusted under 35 U.S.C. 154(b) by 0 days.

(21) Appl. No.: 10/524,740

(22) PCT Filed: Aug. 12, 2003

(86) PCT No.: PCT/EP03/08916

§ 371 (c)(1),
(2), (4) Date: Feb. 16, 2005

(87) PCT Pub. No.: WO2004/018245

PCT Pub. Date: Apr. 3, 2004

(65) Prior Publication Data
US 2005/0217738 A1 Oct. 6, 2005

(30) Foreign Application Priority Data
Aug. 16, 2002 (DE) ................. 102 38 430

(51) Int. Cl. *F16K 3/00* (2006.01)
(52) U.S. Cl. ..................... 251/212; 251/901
(58) Field of Classification Search .......... 251/212, 251/901; 454/75
See application file for complete search history.

(56) References Cited

U.S. PATENT DOCUMENTS

| | | | |
|---|---|---|---|
| 5,145,456 A * | 9/1992 | Ito et al. | 454/75 |
| 5,243,830 A * | 9/1993 | Ito et al. | 62/344 |
| 5,878,806 A | 3/1999 | Denk et al. | |
| 5,906,355 A | 5/1999 | Danieau | |
| 6,074,294 A | 6/2000 | Stevenson | |
| 6,325,096 B1 * | 12/2001 | Rising et al. | 137/454.2 |
| 6,979,258 B2 * | 12/2005 | Goupil et al. | 454/121 |

FOREIGN PATENT DOCUMENTS

| | | |
|---|---|---|
| DE | 23 43 074 A1 | 3/1975 |
| DE | 35 14 358 A1 | 10/1986 |
| DE | 41 40 477 A1 | 6/1993 |
| DE | 44 42 000 A1 | 5/1996 |

(Continued)

OTHER PUBLICATIONS

Patent Abstracts of Japan, vol. 013, No. 295, Jul. 10, 1989 JP 01-085809, Nippon Denso Co., LTD., Mar. 30, 1989.

*Primary Examiner*—John Fox
(74) *Attorney, Agent, or Firm*—Foley & Lardner LLP

(57) ABSTRACT

The invention relates to a roller belt cassette for use in a control device (1) serving to control airflows in motor vehicles, comprised of a roller belt subassembly having a roller louver, which is formed by a roller belt (5), and at least two shafts (6, 7) of which one is a drive shaft (6) and the other is a return shaft (7). The roller belt (5) is formed by an endless belt or is provided in the form of an endless belt. The roller belt cassette can be mounted inside airflow ducts of a heating and/or air-conditioning system for motor vehicles.

15 Claims, 15 Drawing Sheets

FOREIGN PATENT DOCUMENTS

| | | |
|---|---|---|
| DE | 197 11 209 A1 | 10/1997 |
| DE | 197 30 439 A1 | 2/1998 |
| DE | 102 11 190 A1 | 9/2003 |
| EP | 0 545 320 B1 | 1/1997 |
| EP | 0 705 725 B1 | 3/1999 |

* cited by examiner

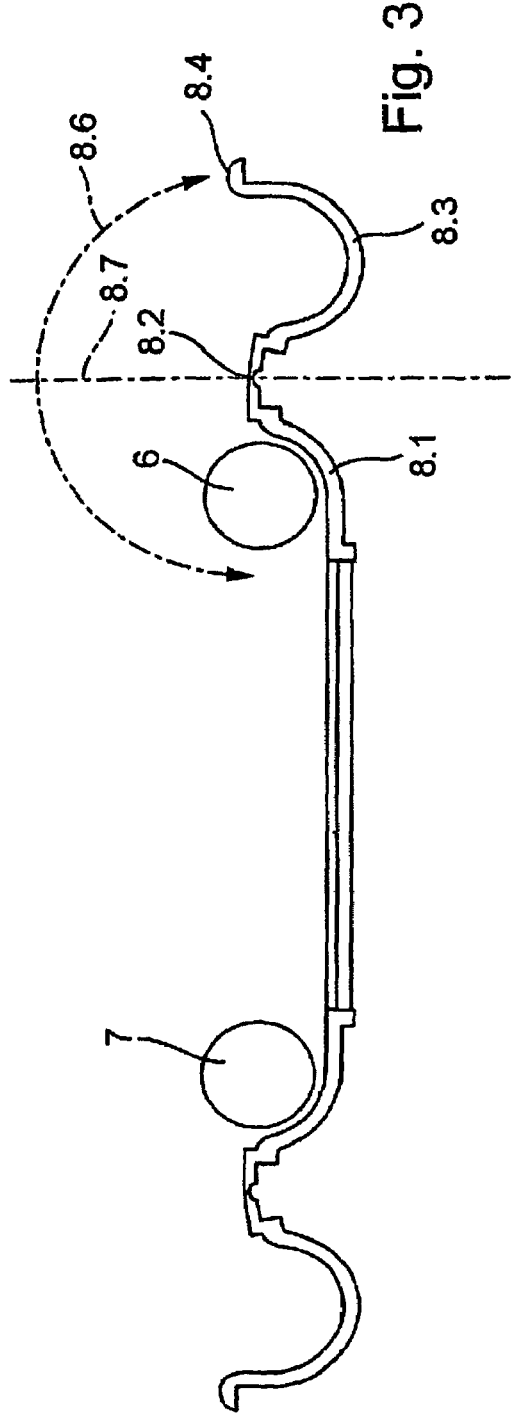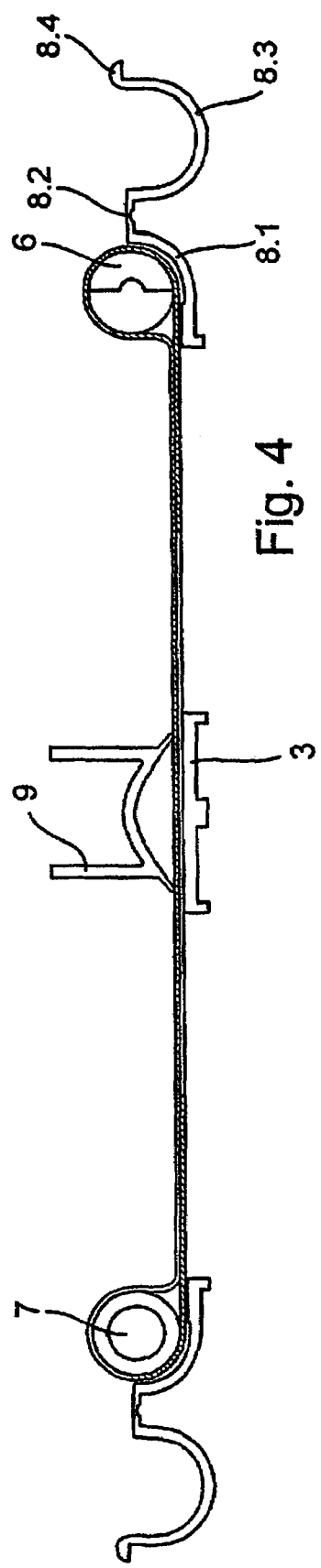

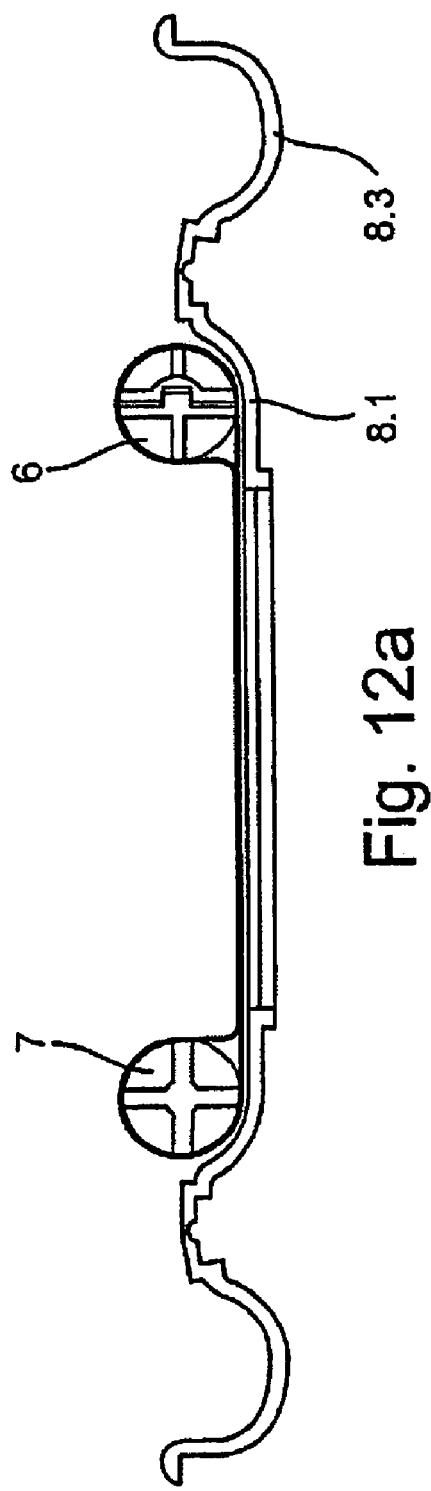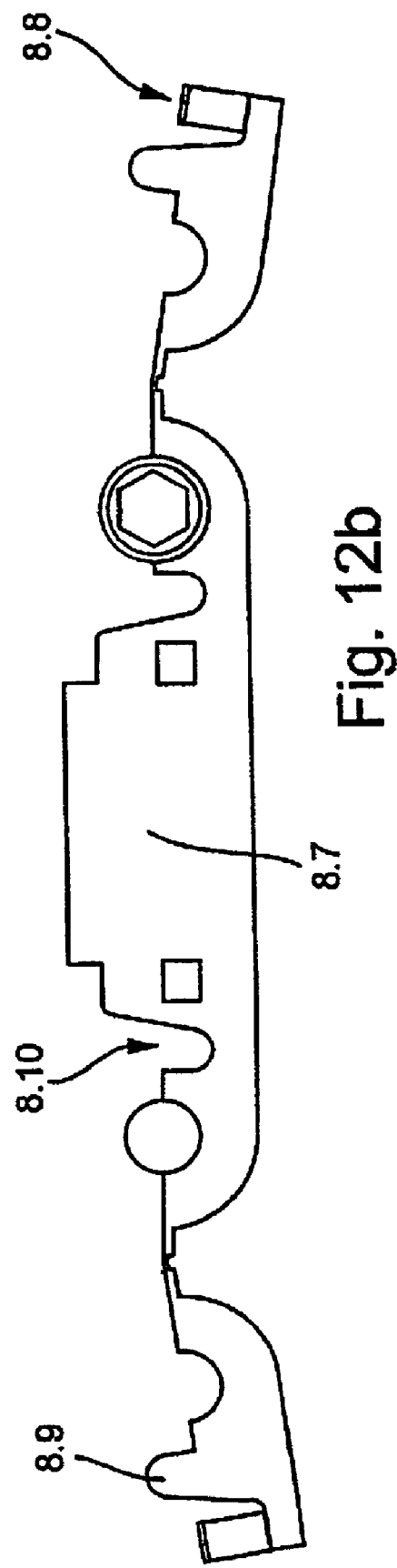

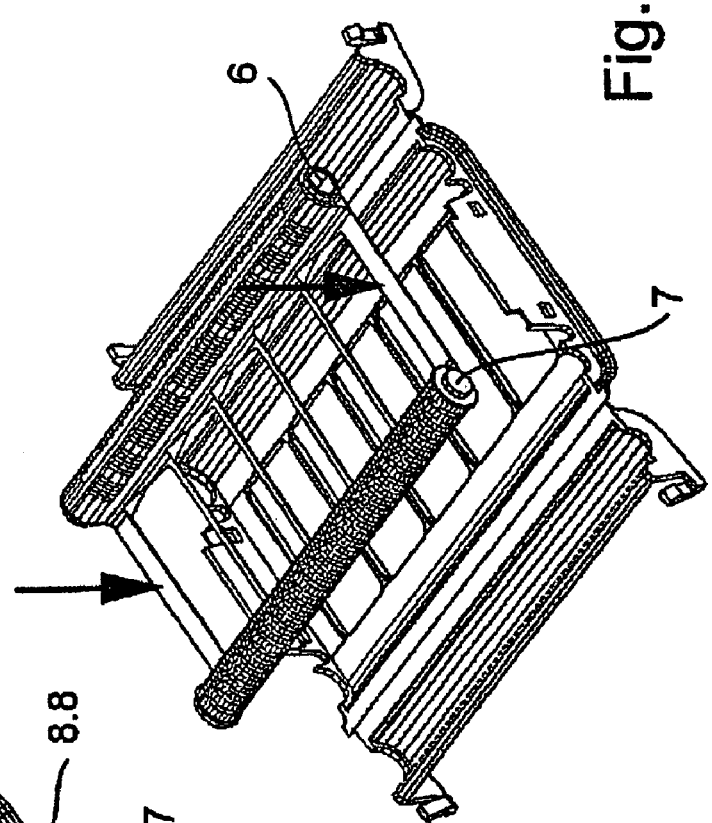
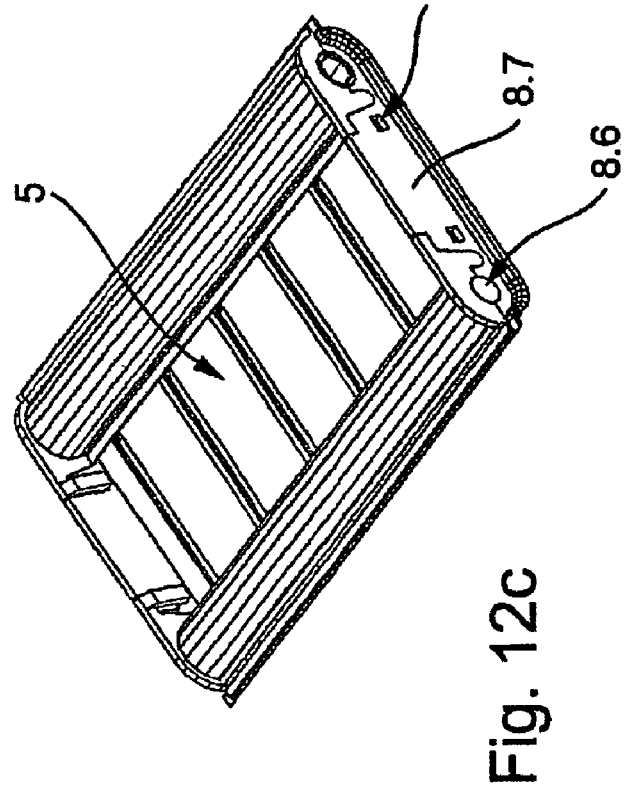

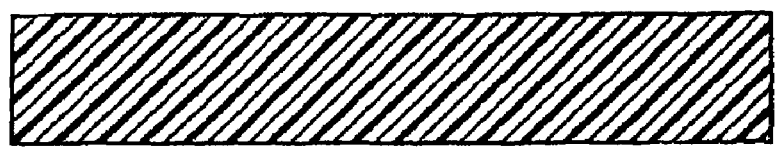
Fig. 14a
Fig. 14b
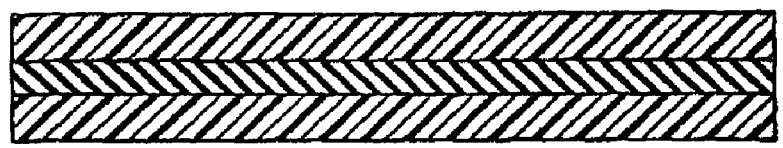
Fig. 14c
5

ROLLER BELT CASSETTE FOR USE IN A CONTROL DEVICE

BACKGROUND OF THE INVENTION

The invention relates to a roller band cassette for use in a control device, in particular for a heating and/or air conditioning system, for controlling air flow streams in motor vehicles.

DE 44 42 000 A1 relates to a control device for a heating and/or air conditioning system which is designed as a louver cassette and is inserted into air ducts of a heating and/or air conditioning system for a motor vehicle. The control device regulates the amount and also the direction of the air flow passing through it. The control device is formed by a frame in which a multiplicity of pivotable slats which form a flap-type louver is arranged. Pivoting of the slats in a range of from 0 to 90° enables the passage cross section for the air flow to be completely closed, completely opened or partially opened up, the direction of the air flow also being influenced by the position of the slats. This louver cassette has a multiplicity of parts, caused by the slat design and the activating means associated therewith. In the case of narrow air gaps, whistling noises and possibly also rattling noises may occur. In addition, a louver cassette of this type has a relatively high air resistance, i.e. decrease of pressure.

DE 35 14 358 A1 has already proposed replacing conventional flaps for controlling the air flows in a heating and/or air conditioning system by a "roller-type louver". The latter comprises a roller band which is partially provided with cutouts and closes or partially or completely opens up the passage openings of air flow ducts. The roller band is wound up and unwound in a manner guided via individual rollers, and is brought by means of a servomotor via a drive roller into a closing, opening or intermediate position.

EP 0 705 725 A1 has disclosed a development of a roller-type louver of this type. In this, a film-like roller band which has, distributed over its length, a multiplicity of different cutouts for the passage of an air flow is guided past the outlet openings of the air conditioning system housing and therefore controls the outlet cross section for the air. In a further application, a roller band of this type is arranged directly in front of the heating element and controls the amount of air passing through the heating element and the bypass flow flowing around the heating element. This type of roller-type louver is adapted in each case to the specific installation conditions and configurations of a specific heating and/or air conditioning system.

It is the object of the present invention to improve a roller band cassette for a control device, in particular for a heating and/or air conditioning system.

SUMMARY OF THE INVENTION

According to the invention, a roller band cassette for use in a control device is provided for controlling air flows in motor vehicles, comprising a roller-band subassembly with a roller-type louver, which is formed by a roller band, and at least two shafts, one shaft being a drive shaft and one shaft being a return shaft, in which the roller band is formed by an endless band or is designed in the manner of an endless band. The roller band of the roller-type louver is in this case designed in such a manner that it accommodates both shafts in the manner of an endless band. In this case, there can be a fixed connection between the roller band and shaft, in particular on the drive shaft, for example by the roller band being attached fixedly to the shaft in some regions, in particular being clamped in a manner such that it runs in the longitudinal direction of the shaft.

In a further embodiment, the roller-type louver is connected fixedly to the drive shaft, the drive shaft comprising, for example, at least two parts between which the roller-type louver is clamped, the two parts being connected to each other by means of clipping or locking. In this case, the two parts of the drive shaft are preferably connected flexibly to each other via a connecting web. The connecting web may be formed here by a spray duct, so that the two parts can be produced in a mold and are connected flexibly to each other.

At least one of the two parts of the drive shaft preferably has projections which serve as fixing pins and engage in holes provided in the roller band. This permits a simple and secure positioning and fixing.

According to one preferred embodiment, the roller band is of multilayer design at least in some regions. In this case, in particular, a layer of aluminum is provided, if appropriate also only in part of the roller band.

In one particularly advantageous embodiment of the invention, the roller-type louver is designed as an endless roller band with clearances for opening up the at least one passage opening.

In a preferred embodiment, the roller band is guided in two layers past the at least one passage opening, the clearances being distributed on the roller band in such a manner that, when a passage opening is closed, each layer of the roller band covers approximately half of the passage opening, the passage opening being opened by the two layers of the roller band moving in opposite directions and opening up the passage opening from the center outward. The two-layered structure advantageously avoids a fluttering of the band and, as a result, reduces the production of noise. The described manner of opening up the passage opening means that only half of the actuating path is required for opening or closing the passage opening.

The drive shaft is driven by means of a servomotor, which is, for example, flanged directly onto the frame, or via a Bowden cable or a flexible shaft. In another embodiment, the servomotor is integrated into the drive shaft, which is designed as a hollow shaft.

The previously described control device is preferably used in heating or air conditioning systems for motor vehicles.

BRIEF DESCRIPTION OF THE DRAWINGS

Exemplary embodiments of the invention are illustrated in the drawing and are described in more detail below. In the drawing:

FIG. 3 shows a sectional illustration of the control device according to FIG. 1b;

FIG. 4 shows a sectional illustration of the control device according to FIG. 2b;

FIGS. 12a-d show an alternative embodiment of the control device;

FIGS. 14a-c show sections through various roller bands.

DETAILED DESCRIPTION

Figure 1A:
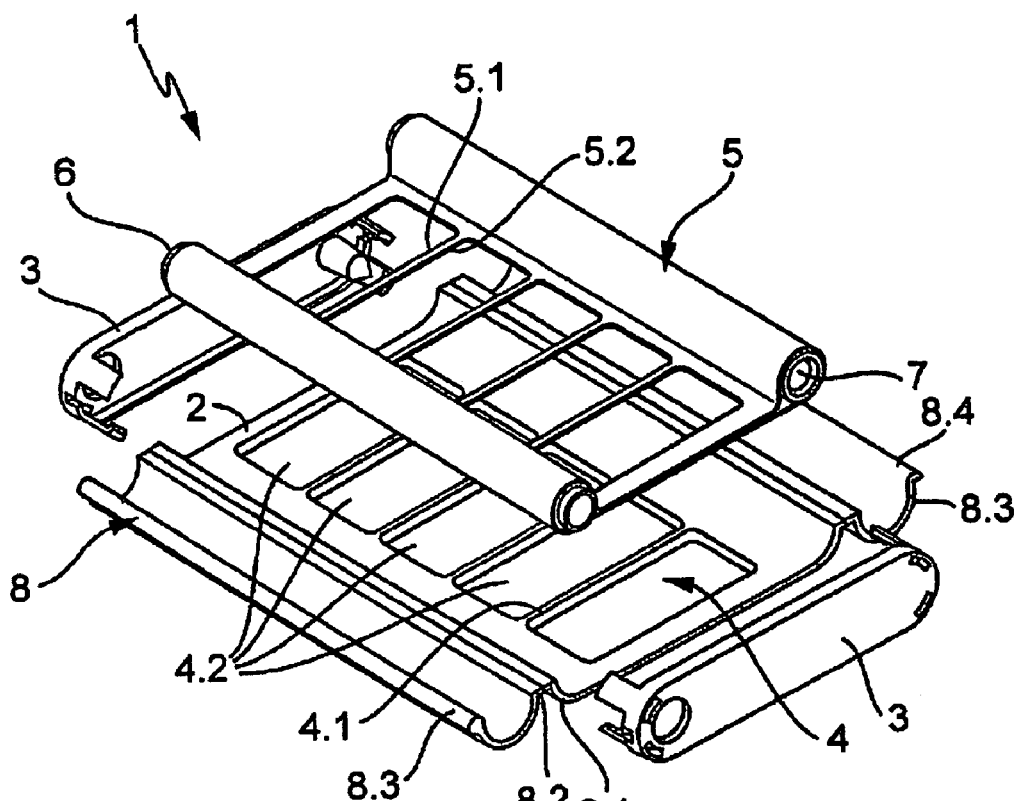
FIGS. 1a-d show a control device having a roller-type louver for changing one passage cross section.

FIG. 1 shows a control device 1, having a frame which comprises a housing 2 and two side parts 3. The housing encloses a passage opening 4 which is divided by lattice bars 4.1 into a plurality of apertures 4.2. These lattice bars 14, which are arranged in parallel, serve to strengthen the housing 3 and also to orient the air flow passing through it. In the exemplary embodiment illustrated, on the longitudinal sides, a respective lower part 8.1 of a hollow body 8, which is open along one longitudinal side, is integrally formed on the housing 2, the hollow body in the exemplary embodiment illustrated being designed as a hollow cylinder, and the two hollow bodies 8 either accommodating a drive shaft 6 or a return shaft 7. An upper part 8.3 is connected pivotably to the lower part 8.1 via a movable element 8.2. When the hollow body is opened, the roller-band subassembly, comprising a roller band 5, the drive shaft 6 and the return shaft 7, can be inserted in a simple manner from above into the housing 2. The upper part 8.3 is then pivoted onto the lower part and the housing 3 is closed on its transverse sides by the side parts 3.

The control means for changing the passage cross section of the passage opening comprise the endless roller band 5, the drive shaft 6 and the return shaft 7. The drive shaft 6 and the return shaft 7 are mounted rotatably in corresponding bearing points of the side parts 8, 9 by means of end-side pins or hollow pins (not illustrated specifically). The roller band 5 is guided over the circumference of the drive shaft 6 and the return shaft 7. The roller band 5 has cutouts 5.1 which correspond in their cross sections to that of the apertures 4.2 in the housing 2. The cutouts 5.1 are divided by individual, narrow strips 5.2, so that in the roller band 5 the required tensile stress is maintained over the entire width and an airtight contact of the roller band 5 against the two shafts 6 and 7 is ensured.

FIGS. 1a to 1d show the individual parts of the control device 1 and the sequence during the assembly of the control device 1. FIG. 1a shows the housing 3 with the upper part 8.3 of the hollow body 8 pivoted open.

Figure 1B:
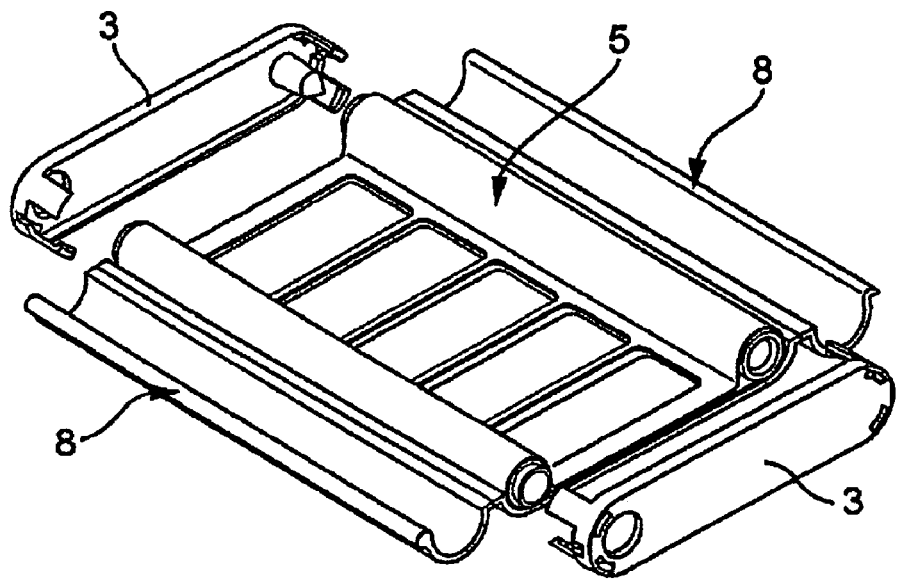

FIG. 1b shows the housing with the roller-band subassembly inserted in it, the drive shaft and the return shaft being inserted into the two lower parts 8.1 of the hollow bodies.

Figure 1C:
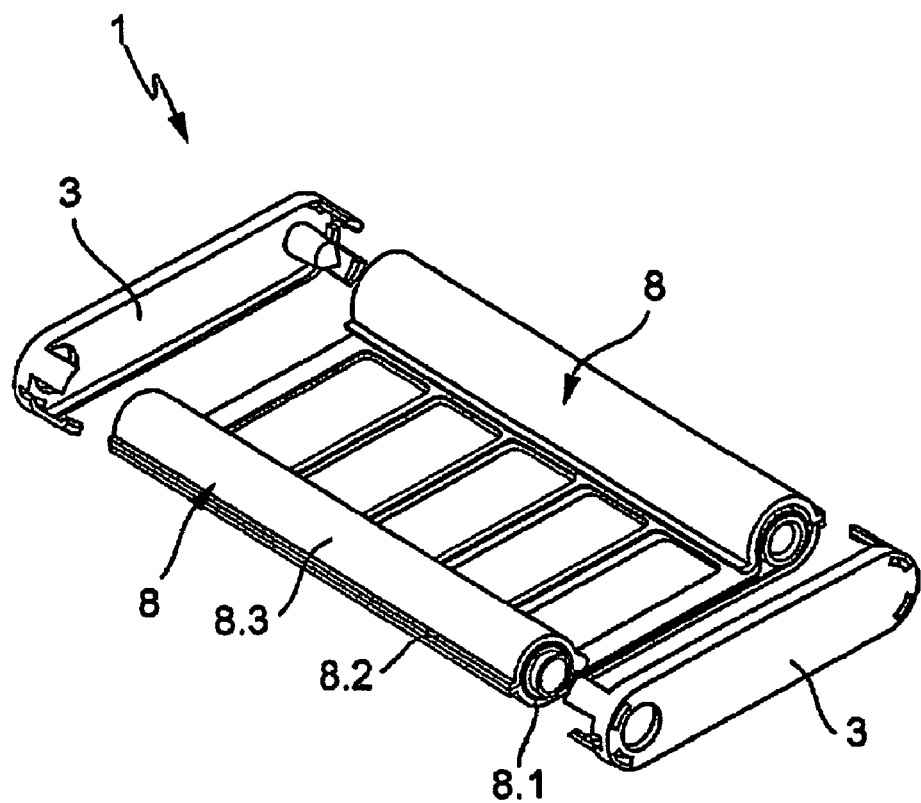

FIG. 1c shows the housing with the hollow body closed, i.e. the upper part 8.3 has been pivoted onto the lower part via the moveable element, which is designed in the exemplary embodiment illustrated as a film hinge, as a result of which the hollow body 8 is closed apart from a longitudinal slot 8.4 through which the roller band 5 is guided.

Figure 1D:
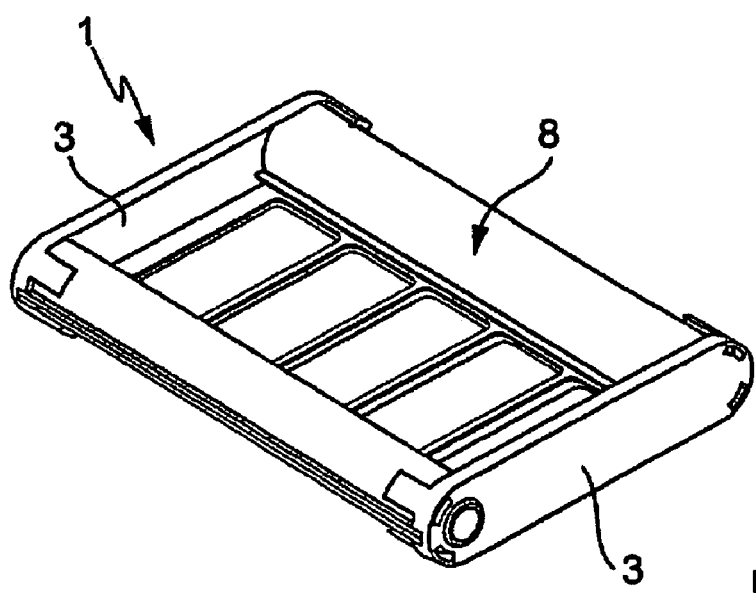

FIG. 1d shows the control device with the housing 2 closed by the side parts 3.

The control device described is inserted into a heating and/or air conditioning system (not illustrated here) for a motor vehicle, the control device being adapted with regard to its external dimensions to the particular air flow duct, so that the entire air flow cross section can be controlled by the cassette. In the exemplary embodiment illustrated, the passage cross section of a passage opening 4 can be controlled by five apertures 4.2.

FIG. 2 shows a control device 1 having a frame which comprises a housing 2 and two side parts 3. In contrast to the exemplary embodiment in FIG. 1, the housing here encloses two passage openings 4 which are divided by lattice bars 4.1 into a plurality of apertures 4.2. As is apparent from FIG. 2, the control device, analogously to the control device according to FIG. 1, likewise comprises a housing 2 with hollow bodies 8 integrally formed on it for accommodating the drive shaft 6 and the return shaft 7, and two side parts 3 and a roller band 5. In addition, a supporting device 9 for the additional guidance of the roller band 5 is arranged between the two passage openings 4. In the exemplary embodiment illustrated, the passage cross section can be controlled by two passage openings 4. The illustration shows a first starting position in which the left passage opening is completely opened and the right passage opening is completely closed.

Figure 2A:
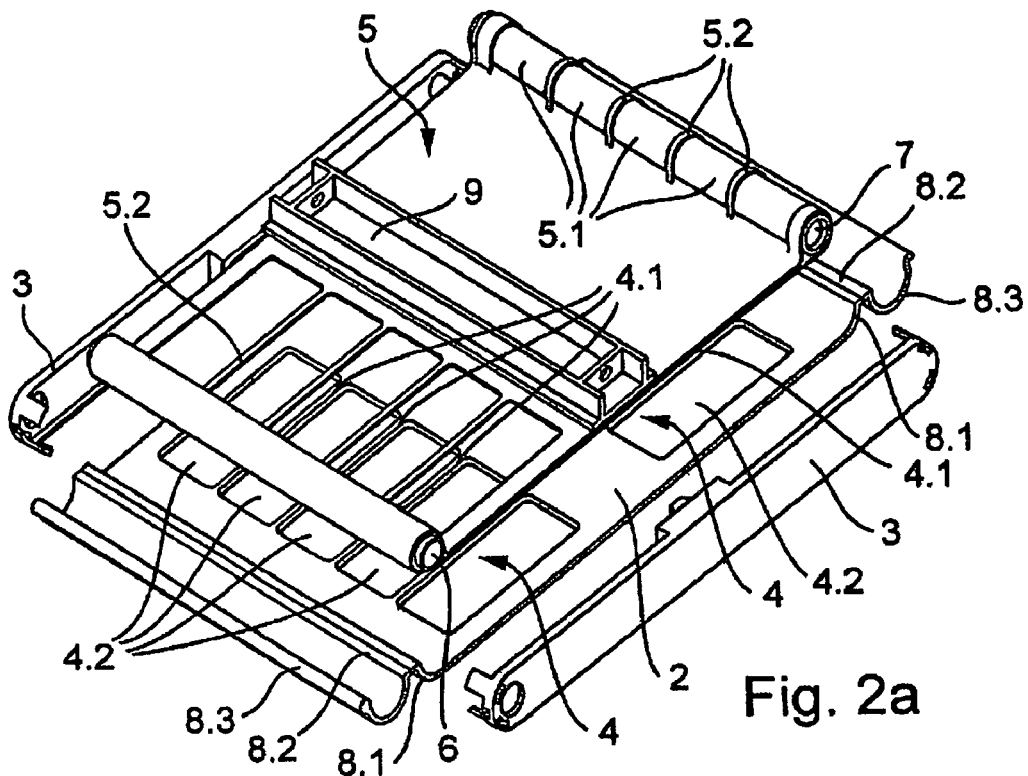
FIGS. 2a-d show a control device having a roller-type louver for changing two passage cross sections.

FIGS. 2a to 2d show the individual parts of the control device 1 for controlling two passage openings and the sequence during the assembly of the control device 1. FIG. 2a shows the housing 2 with the upper part 8.3 of the hollow body 8 pivoted open.

Figure 2B:
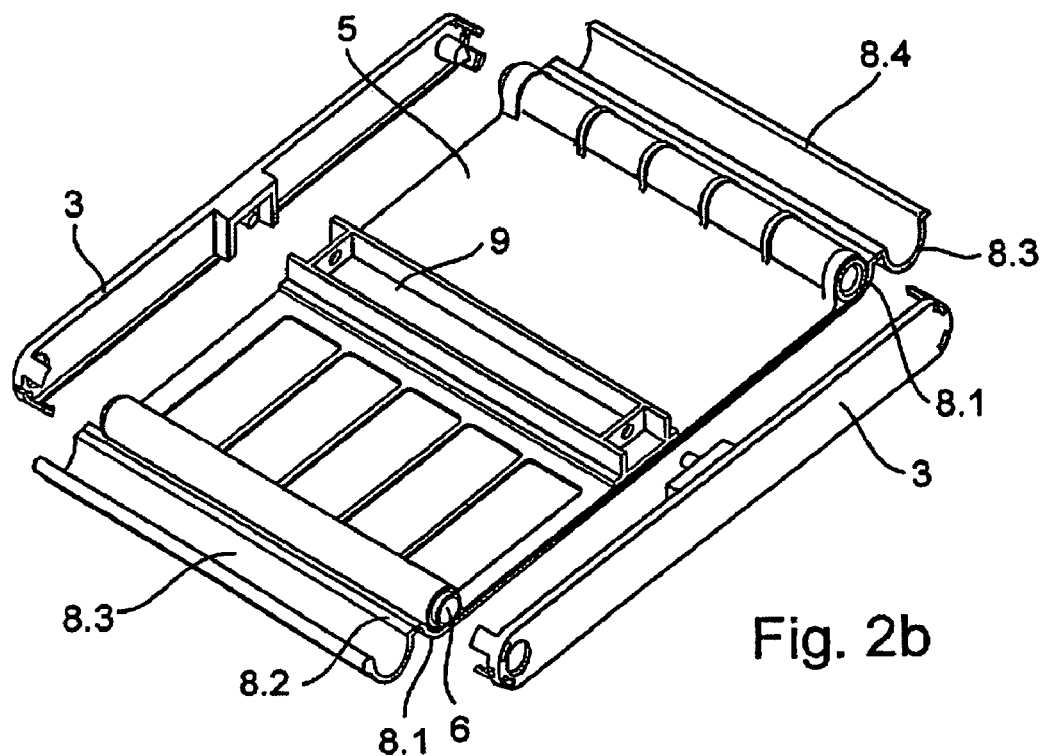

FIG. 2b shows the housing with the roller-band subassembly (roller band 5, drive shaft 6, return shaft 7) inserted and with a supporting device 9 placed between the passage openings 4, the drive shaft 6 and the return shaft 7 being inserted into the two lower parts 8.1 of the hollow bodies 8.

Figure 2C:
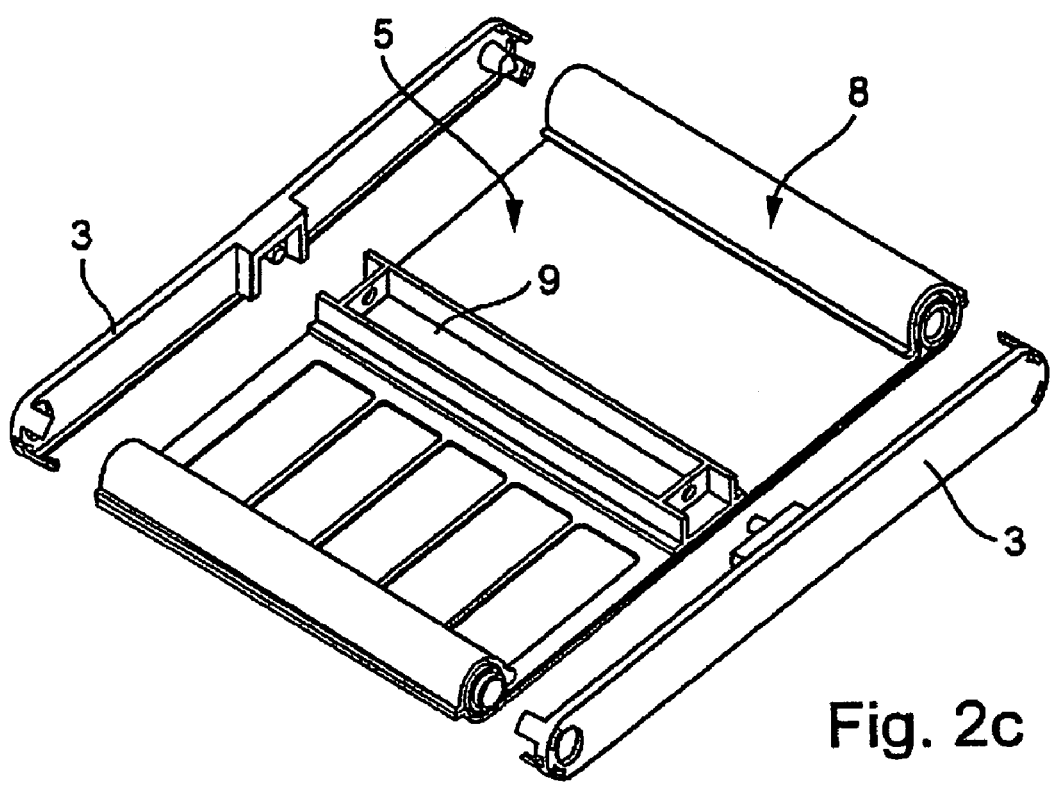

FIG. 2c shows the housing 2 with the hollow body 8 closed, i.e. the upper part 8.3 has been pivoted onto the lower part 8.1 via the moveable element 8.2, which is designed in the exemplary embodiment illustrated as a film hinge, as a result of which the hollow body 8 is closed except for a longitudinal slot 8.4 through which the roller band 5 is guided.

Figure 2D:
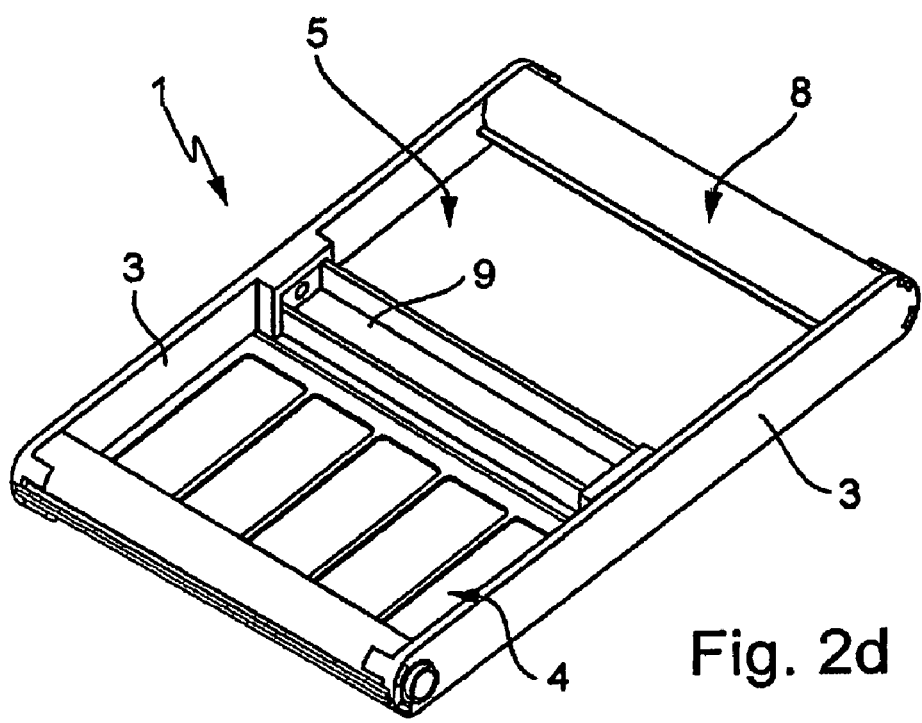

FIG. 2d shows the control device with the housing 2 closed by the side parts 3, the supporting device 9 likewise being connected, for example clipped, to the side parts.

FIG. 3 shows a sectional illustration of the control device 1 according to FIG. 1b without a roller band 5, in order to illustrate the pivoting movement 8.6 of the upper part 8.3 of the hollow body 8 about the pivot axis 8.7 which runs approximately centrally through the moveable element 8.2. As is apparent from FIG. 3, a lug 8.4 is integrally formed on the open end of the upper part 8.3, the lug facilitating the guidance of the roller band 5 when the hollow body 8 is closed.

FIG. 4 shows a sectional illustration of the control device 1 according to FIG. 2b with the roller-band subassembly (roller band 5, drive shaft 6, return shaft 7) inserted and the supporting device 9 placed on it.

Figure 5A:
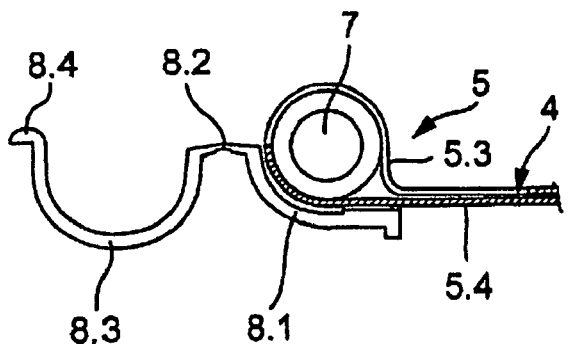
FIGS. 5a-b show a sectional illustration of the region of the return shaft according to FIGS. 1b and 2b.
Figure 5B:
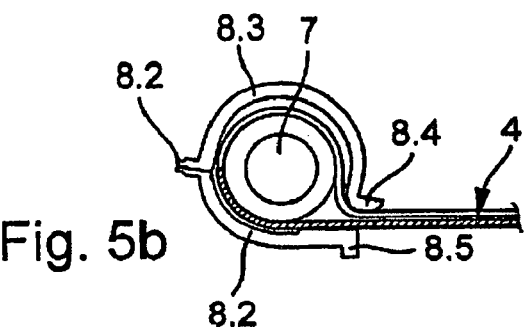

FIG. 5 shows a section through the region of the return shaft 7 according to FIGS. 1b and 2b. FIG. 5a shows the region with the roller-band subassembly inserted into the housing 2 and with the hollow body opened. FIG. 5b shows the region of the roller-band subassembly inserted into the housing 2 and with the hollow body 8 closed. As is apparent from FIG. 5, the roller band 5 is guided in two layers 5.3, 5.4 over the passage openings 4. The lug 8.4 which is integrally formed on the upper part 8.3 of the hollow body facilitates the guidance of the roller band 5 through the longitudinal opening 8.5 of the hollow body 8.

Figure 6A:
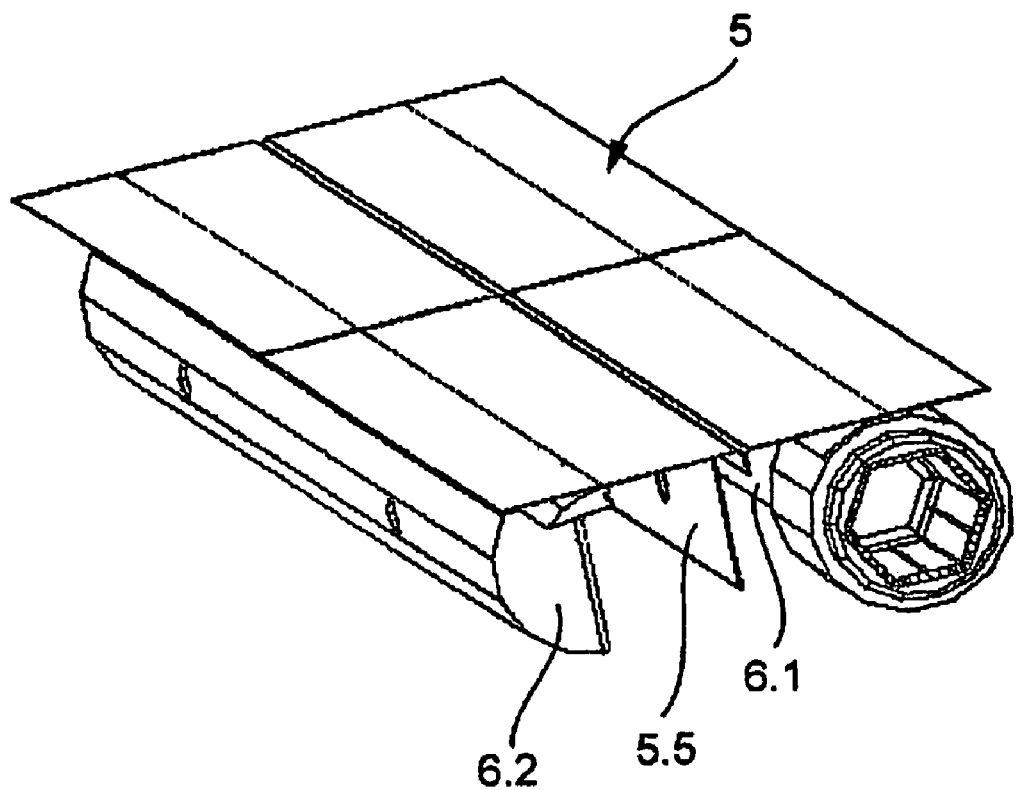
FIGS. 6a-b show a sectional illustration of the drive shaft with the roller band.
Figure 6B:
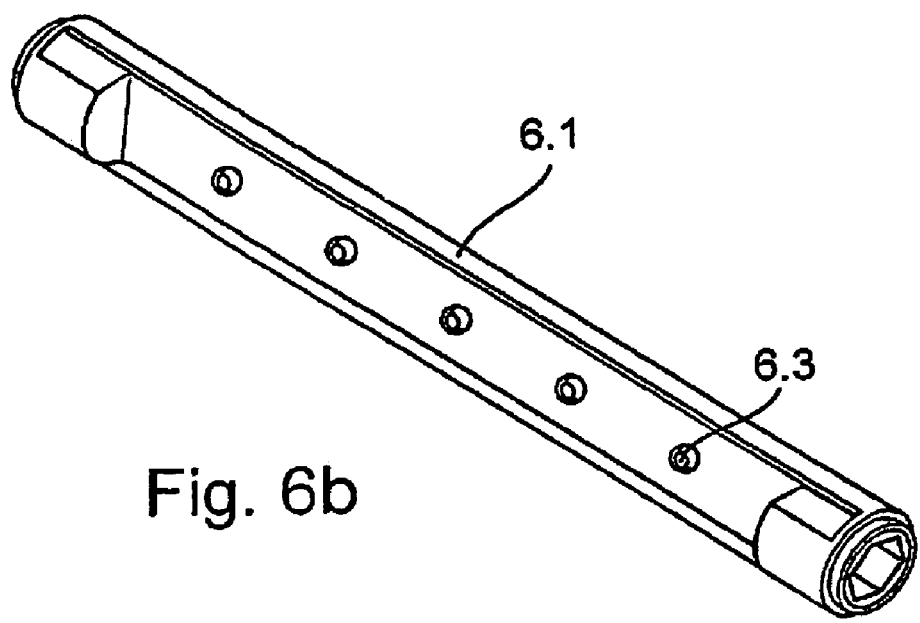

FIG. 6 shows a schematic illustration of the connection of the roller band 5 to the drive shaft 6. As is apparent from FIG. 6a, the drive shaft 6 comprises a lower part 6.1 and an upper part 6.2, it being possible for the upper part 6.2 to be connected to the lower part 6.1 by means of a clip connection 6.3. For the connection to the drive shaft 6, at its ends the roller band has, for example, holes 5.5 through which it is fixed on the lower part 6.1 of the drive shaft 6. When the upper part 6.2 is clipped to the lower part 6.1, the roller band is then clamped and, as a result, is connected fixedly to the drive shaft. For clarification, FIG. 6b shows an illustration of the lower part 6.1 of the drive shaft 6 with the corresponding clips 6.3 for the clip connection to the upper part 6.2.

Figure 7A:
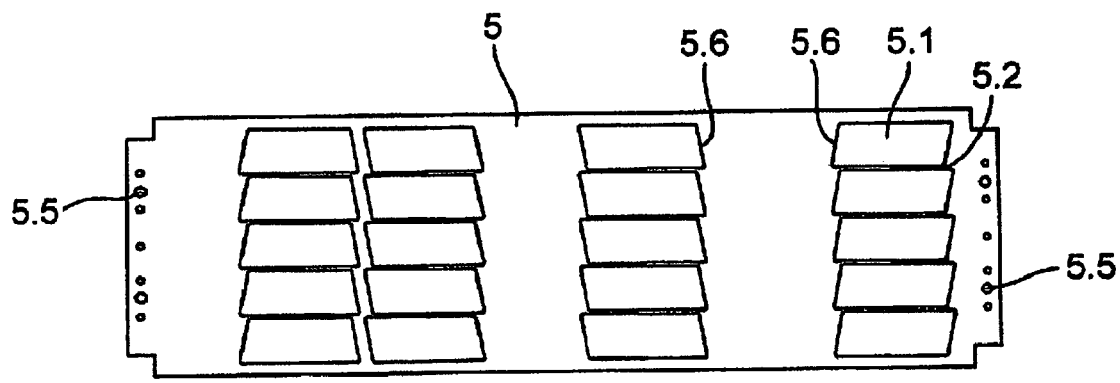
FIGS. 7a-c show various roller bands in a schematic illustration.
Figure 7B:
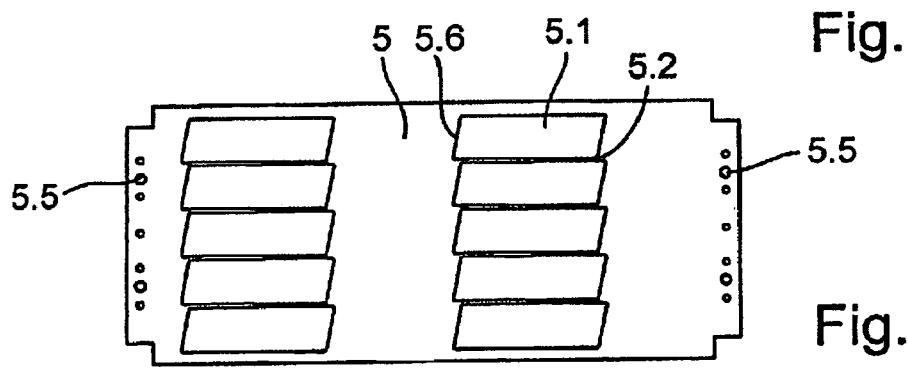
Figure 7C:
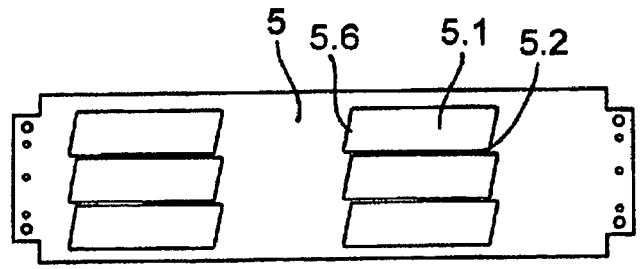

FIG. 7 shows various roller bands 5 in a schematic illustration. Thus, FIG. 7a shows a roller band 5 for controlling two passage openings. The roller band 5 has cutouts 5.1 which correspond with regard to their cross sections to that of the apertures 4.2 in the housing 2. The cutouts 5.1 are divided by individual, narrow strips 5.2. The edges 5.6 of the cutouts are preferably beveled in order to ensure that the two roller-band layers easily run over one another. At the two ends, the roller band 5 has holes 5.5 for the fastening to the drive shaft 6. FIGS. 7b and 7c show roller bands for controlling a passage opening having a different number of apertures 4.1.

Figure 8:
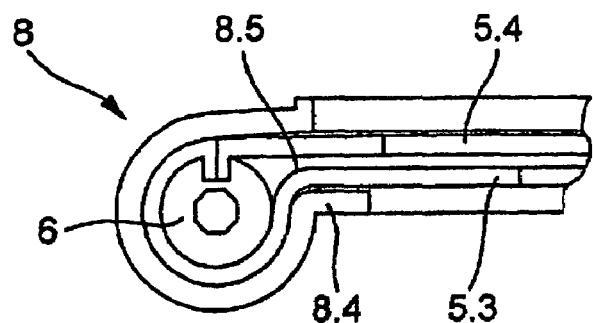
FIG. 8 shows an enlarged detail of the drive shaft with the roller band.

FIG. 8 shows an enlarged detail of the roller band 5 in the region of the drive shaft 6 corresponding to the illustration in FIGS. 1d and 2d, the same reference numbers being used to a very great extent. As is apparent from FIG. 8, the roller band 5 is connected at its two ends fixedly to the drive shaft 6. The design of the roller band 5 as an endless band causes the formation of an upper layer 5.4 and a lower layer 5.3 which move in relation to each other when the drive shaft 6 is rotated. A suitable arrangement of cutouts therefore makes it possible to open the passage openings from the center of the passage opening outward or to close them from the outside to the center. The drive shaft 6 is situated in the hollow body 8 of the housing 3, the hollow body 8 having a slot 8.5 in the direction of the center of the housing. The upper part 8.3 of the hollow body 8 merges into a resiliently designed lug or tongue 8.4 having a radius R, above which the roller band 5 is introduced into the hollow body 8 and is led out of it again. The endless roller band 5 has an upper layer 5.4 and a lower layer 5.3 which move in an opposed manner with respect to each other. The roller band 5 loops around approx. ¾ of the circumference of the drive shaft 6 and is tensioned by the resilient tongue 8.4. The tongue 8.4 therefore replaces a tensioning roller.

As further possibilities for the connection of the roller band 5 to the drive shaft 6, the roller band 5 may also be fastened at its two ends to the drive shaft 6 by the roller-band ends being welded to the drive shaft 6 in the longitudinal direction thereof. In the case of the described fastenings to the drive shaft, the adjustment path for the roller band is dependent on the circumference of the drive shaft or on the angle of wrap.

Figure 13A:
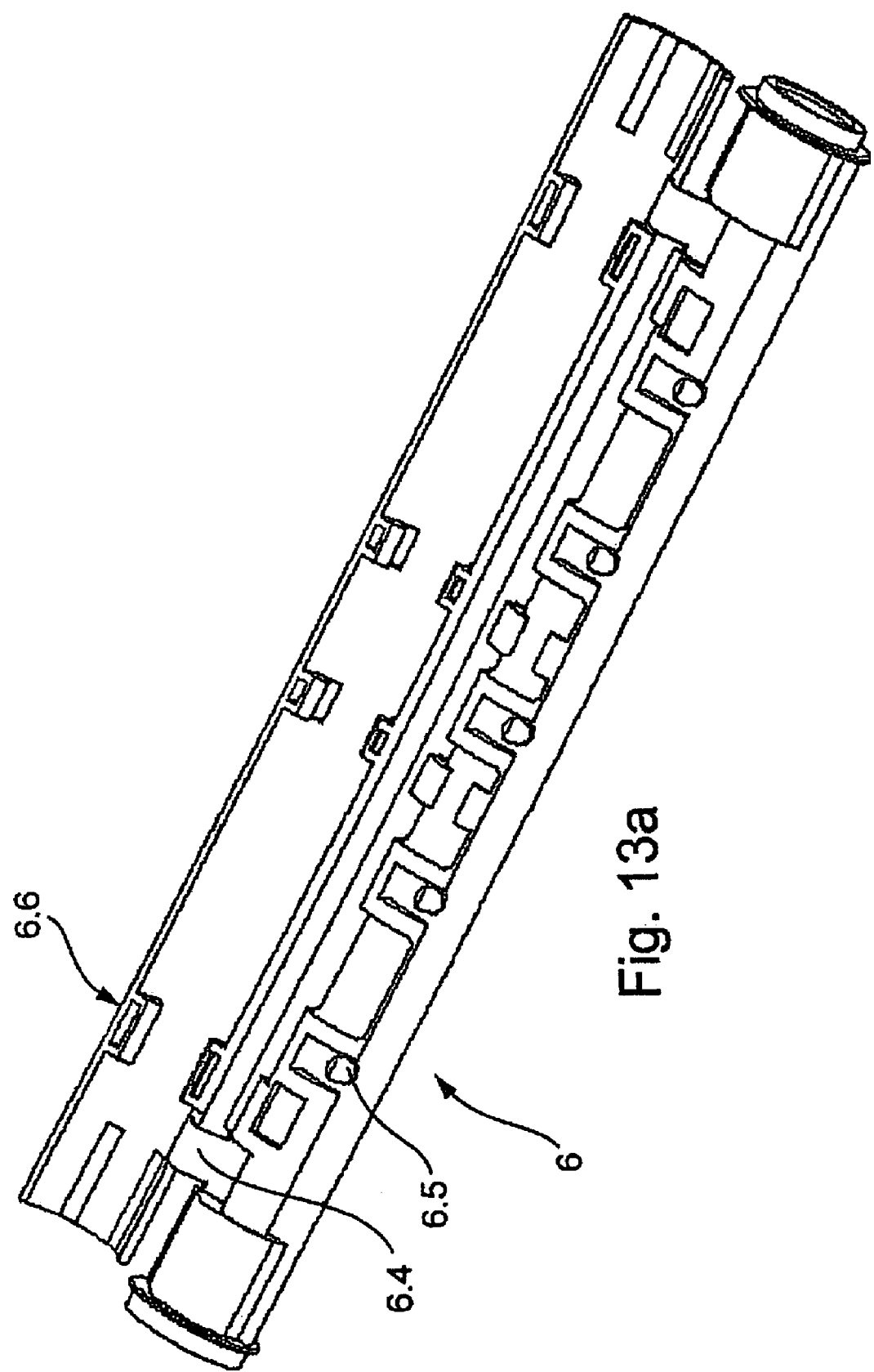
FIGS. 13a-c show a further embodiment.
Figure 13B:
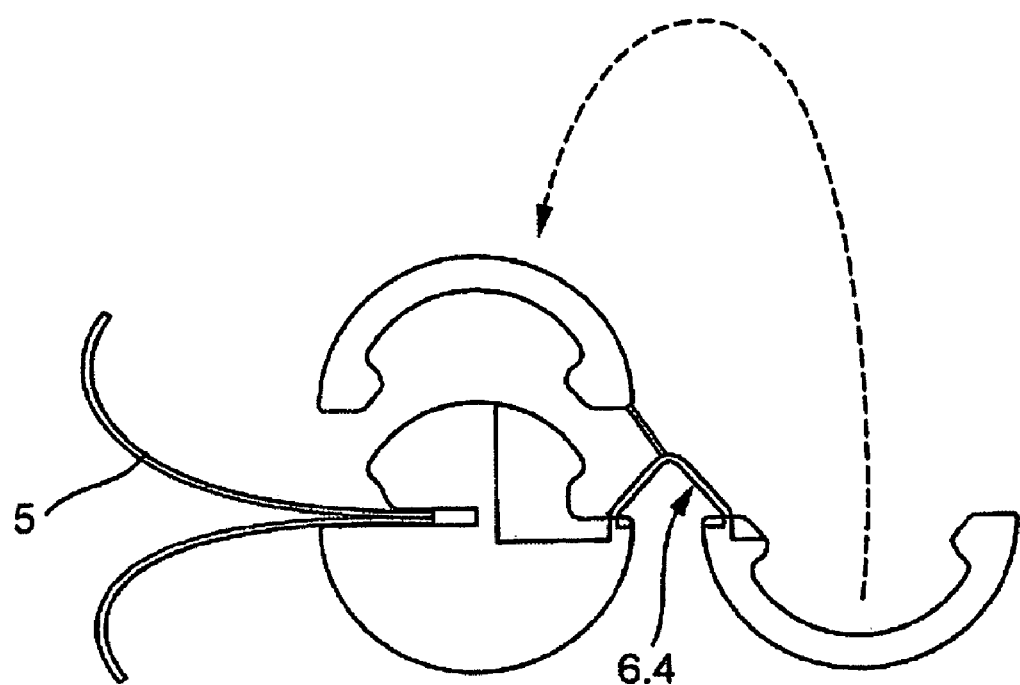
Figure 13C:
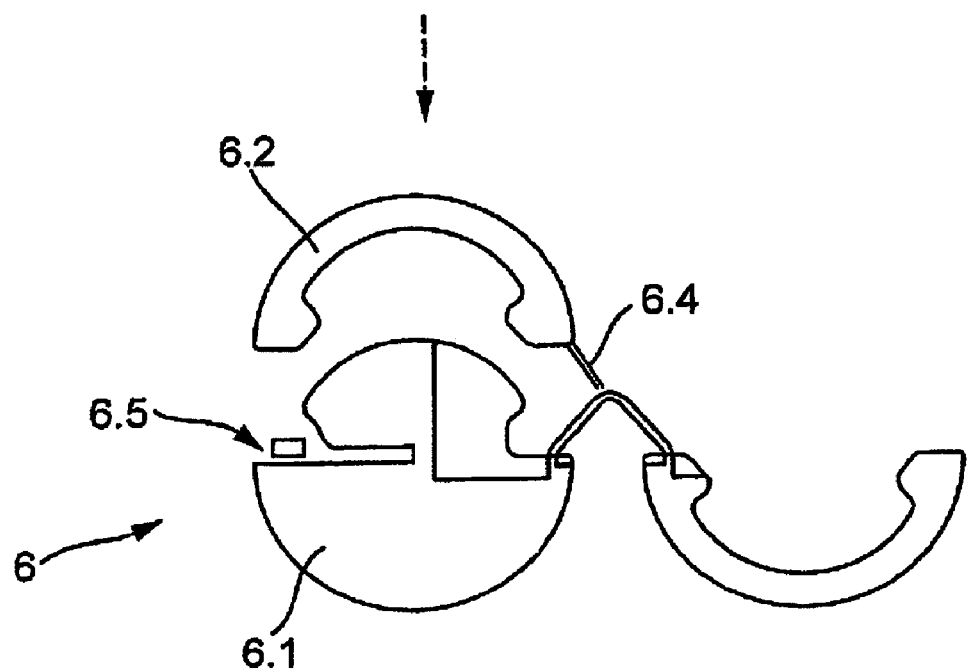

A further possibility for connecting the roller band 5 to the drive shaft 6 is explained in more detail with respect to FIGS. 13a to 13c. In this case, the drive shaft 6 is of two-part design with a lower part 6.1 and an upper part 6.2, the two parts 6.1 and 6.2 being connected integrally to each other via two connecting webs 6.4, which basically have a type of hinge function. The connecting webs 6.4 have an essentially rectangular cross section of 0.5 mm×2 mm and are formed by spray ducts, with a buckling point being provided approximately centrally. In this case, the connecting webs 6.4 are designed in such a manner that they are arranged in the interior of the drive shaft 6 when the two parts 6.1 and 6.2 are folded together.

The roller band 5 is in principle positioned in the above-mentioned manner by means of fixing pins 6.5 and is clamped between the two parts 6.1 and 6.2 by means of snap hooks 6.6 (clip connection). The connection of the two parts 6.1 and 6.2 takes place, as is apparent from FIG. 13b and FIG. 13c (see the corresponding arrows in the figures) by means of a combined pivoting/longitudinal movement, with essentially a longitudinal movement taking place for the clipping (cf. FIG. 13c). With regard to the design of the roller band 5, reference is made to FIGS. 7a to 7c, in particular with regard to the holes 5.5 on the two edges thereof.

The roller band 5 may be a single-layer film (monofilm), as illustrated in FIG. 14a. A film of aluminum or a multi-layered film having a layer of aluminum, as illustrated in FIGS. 14b and 14c, is particularly suitable in particular with regard to a low heat conductivity. The layer of aluminum may be, for example, vapor-deposited or bonded on, if appropriate also only in one region of the roller band. The roller band 5 consists, in particular, of readily glidable, abrasion-resistant material which is thermally stable in a region of from −40° C. to 100° C. Furthermore, the roller band should be low in noise and water-repellent. The layer thicknesses may differ here.

Figure 9A:
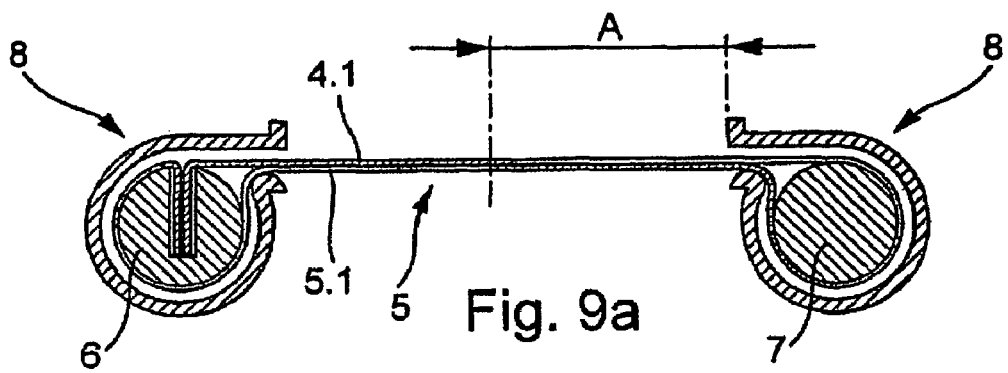
FIGS. 9a-c show a sectional illustration of the control device according to FIG. 1.
Figure 9B:
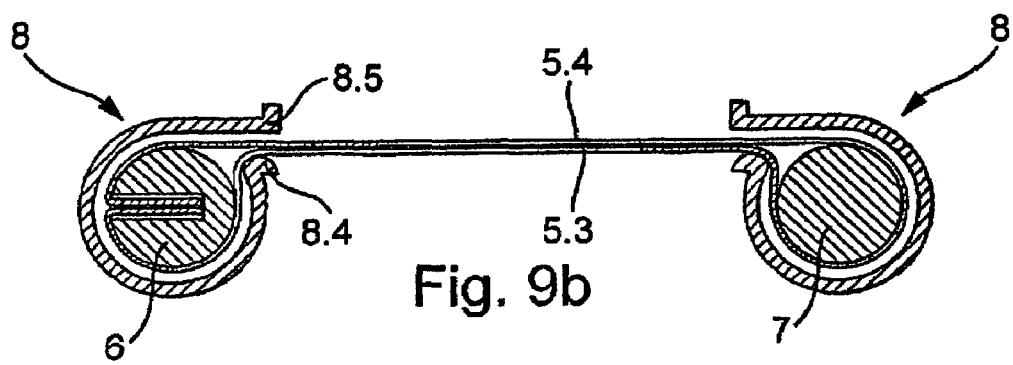
Figure 9C:
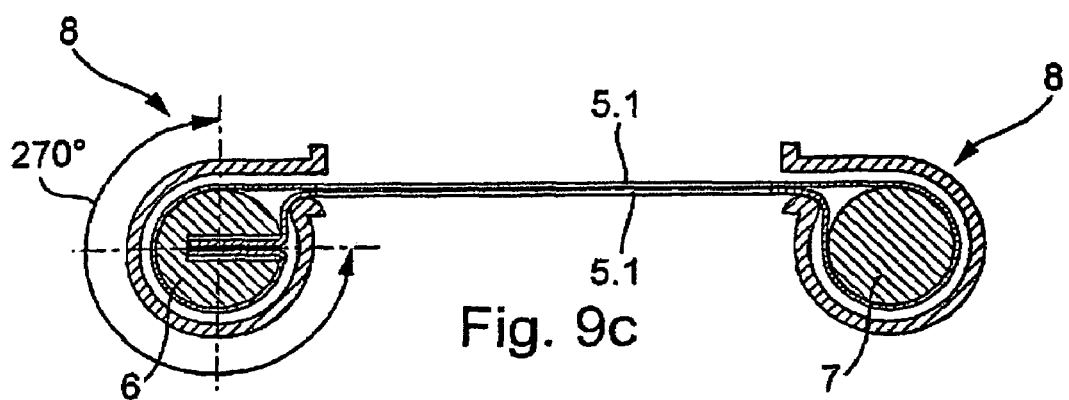

FIGS. 9a to 9c show a sectional illustration of the control device according to FIG. 1 during the transition from a first starting position (passage opening closed) into a second starting position (passage opening opened) via an intermediate position (passage opening partially opened). As is apparent from FIG. 9, because of the use of the two layers 5.3, 5.4 of the roller band 5, the roller band 5 requires a shorter adjustment path in order to bring the passage opening from the closed starting position into the opened starting position, since each layer has to be moved only by an adjustment path which corresponds approximately to half of the width A of the passage opening 4. For this purpose, the drive shaft has to be rotated further through an angle of approximately 270°. It emerges from this that, in the case of the exemplary embodiment illustrated, ¾ of the circumference of the drive shaft or of the return shaft corresponds approximately to half of the width A of the passage opening.

Figure 10A:
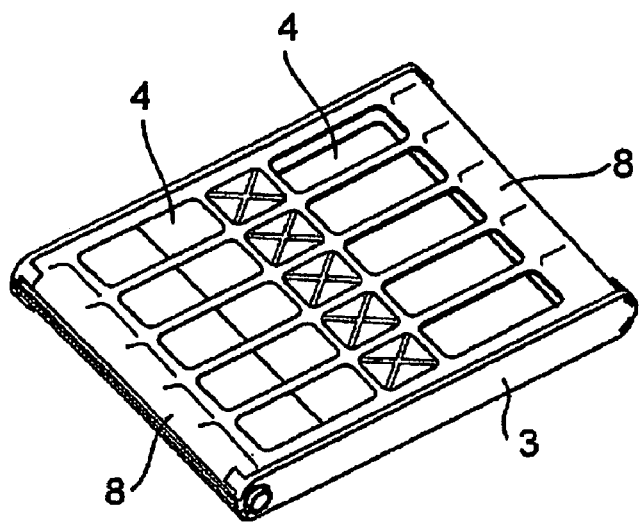
FIGS. 10a-c show a control device according to FIG. 2.
Figure 10B:
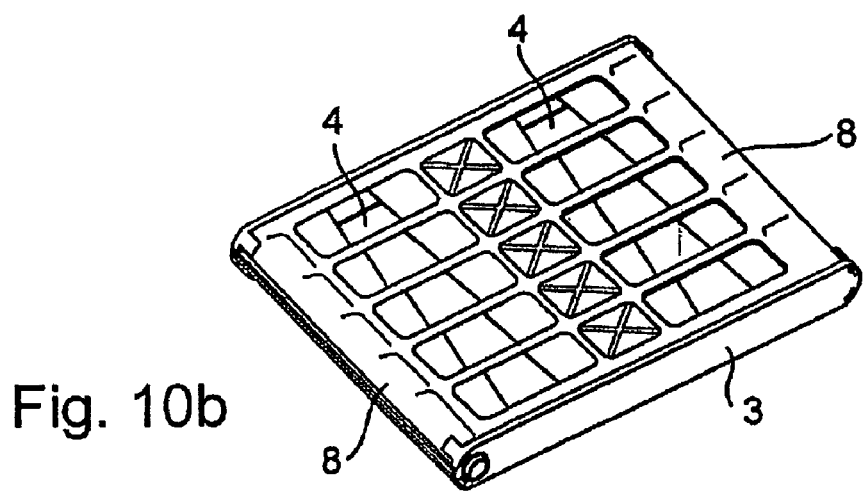
Figure 10C:
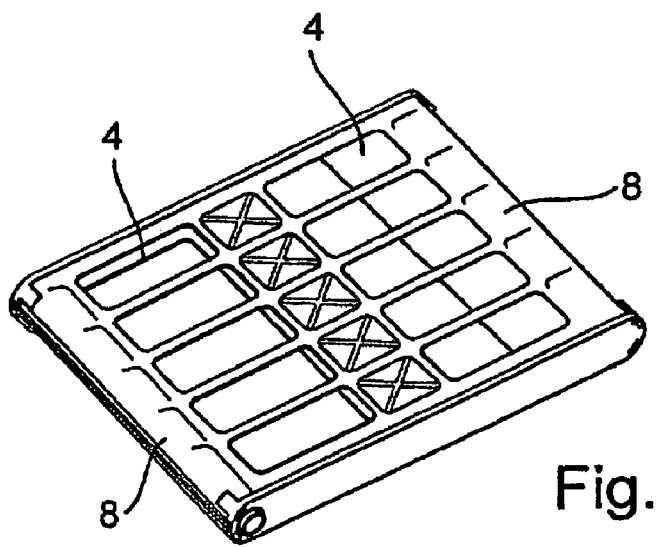

FIGS. 10a to 10c show the control device according to FIG. 2 during the transition from a first starting position (left passage opening opened, right passage opening closed) into a second starting position (left passage opening closed, right passage opening opened) via an intermediate position (both passage openings partially opened). As is apparent from FIG. 10, opened apertures are closed from the outside to the center and closed apertures are opened from the center to the outside.

Figure 11:
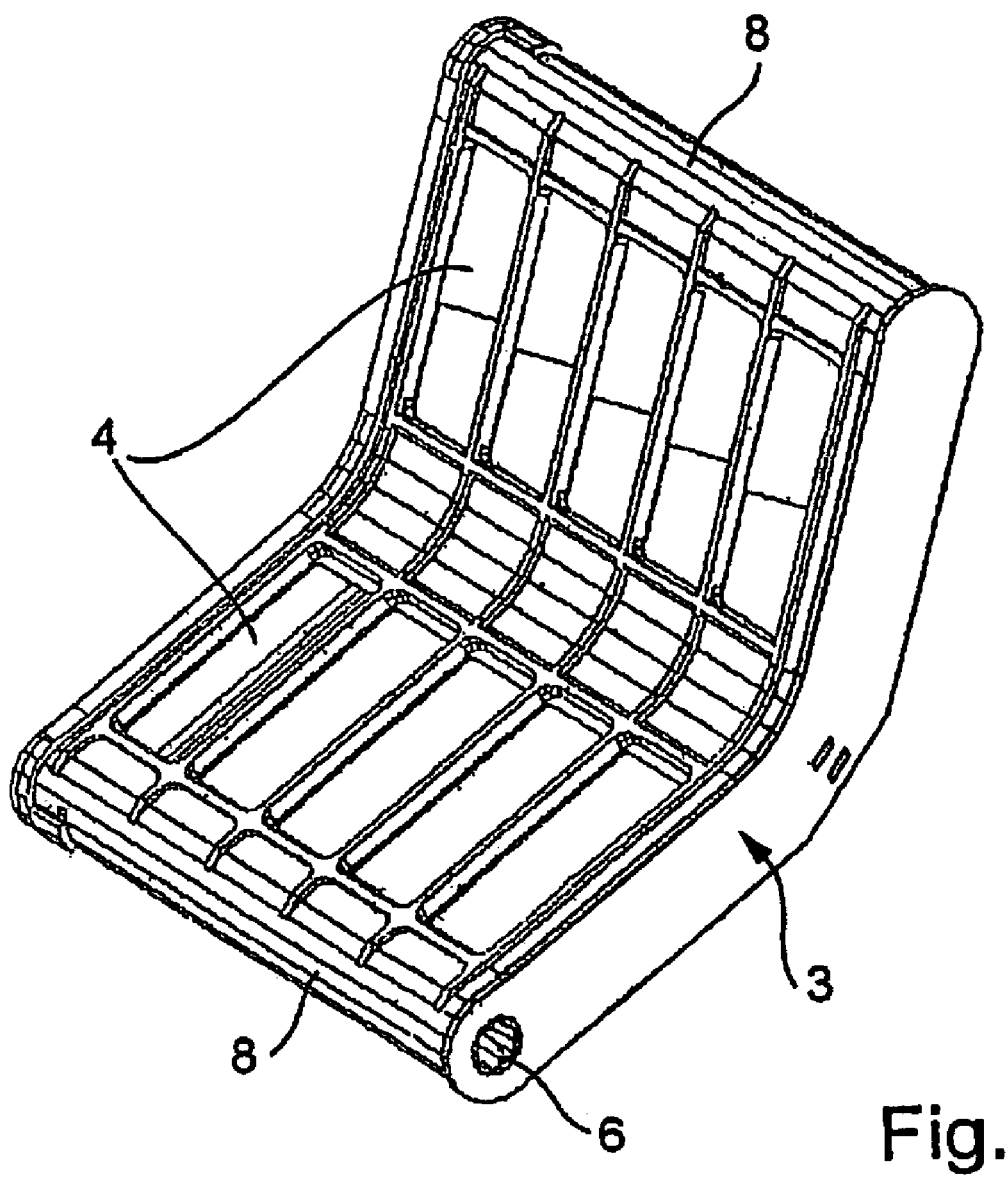
FIG. 11 shows an alternative embodiment of the control device for controlling two air flows.

FIG. 11 shows an embodiment of the control device for controlling two air flows which run at a predetermined angle with respect to one another. For this purpose, the two passage openings are arranged at the predetermined angle with respect to each other. The angle is achieved by a corresponding design of the region between the two passage openings.

FIGS. 12a to 12d show an embodiment, in which bearing points 8.6 which are integrated into the hollow bodies 8 are provided for the drive shaft 6 and return shaft 7. In this case, regions which are cut out or recessed in the form of a semicircle are provided in the lower part 8.1 and upper part 8.3 on side walls 8.7 and form the bearing points 8.6. In this case, the side walls 8.7 can be of widened design in this region, so that the material is subjected to a lower loading. A side part 3 which is placed on, as illustrated, for example, in FIG. 1a, can be omitted, since the two side walls 8.7, which are formed on the housing 2 with lower parts and upper parts 8.1 and 8.3, take on the function thereof.

The two shafts are inserted together with the roller band 5 into the lower bearing points 8.6 in the direction of the two arrows of FIG. 12*d*. The upper parts 8.3 are then pivoted shut, so that the upper bearings 8.6 come into contact with the shafts. The locking of lower and upper part takes place by means of a clip connection 8.8 which is provided on the side walls 8.7, as can be gathered in particular from FIG. 12*d*. For the positioning and improved transmission of force in the radial direction of the side walls 8.7 with respect to the bearing points 8.6, a lug 8.9 is provided on the side walls 8.7 of the upper part 8.3 and, during the closing process, passes into a corresponding receptacle 8.10 which is formed on the side walls 8.7 of the lower part 8.1.

The invention claimed is:

1. A roller band cassette for use in a control device for controlling an air flow stream in a motor vehicle, comprising:
    a roller-band subassembly with a roller-type louver, which comprises a roller band, a drive shaft, and a return shaft,
    wherein the roller band comprises an endless band,
    wherein the drive shaft comprises at least two parts,
    wherein the roller band is held between the two parts of the drive shaft, and
    wherein the two parts of the drive shaft are connected flexibly to each other in an open state via at least one connecting web.

2. The roller band cassette as claimed in claim 1, wherein the roller band bears only against a sub-region of the outer circumference of the drive shaft and of the return shaft.

3. The roller band cassette as claimed in claim 1, wherein both ends of the roller band or a folded region of the roller band is clamped or welded between the two parts of the drive shaft.

4. The roller band cassette as claimed in claim 1, wherein the two parts of the drive shaft are connected to each other by a clipping or locking connection.

5. The roller band cassette as claimed in claim 1, wherein at least one of the two parts of the drive shaft has projections which serve as fixing pins and engage in holes provided in the roller band.

6. The roller band cassette as claimed in claim 1, wherein the roller band comprises multiple layers in at least some regions.

7. The roller band cassette as claimed in claim 6, wherein the roller band comprises at least one metal layer.

8. The roller band cassette as claimed in claim 1, wherein the roller band comprises at least one opening for opening up an air passage cross section.

9. The roller band cassette as claimed in claim 1, further comprising a housing with at least one passage opening,
    wherein the roller band is arranged so as to be guided in two layers past the at least one passage opening,
    wherein a plurality of openings are distributed on the roller band in such a manner that, when the passage opening is closed, each of the two layers of the roller band covers approximately half of the passage opening, and
    wherein the passage opening is configured to be opened by the two layers of the roller band moving in opposite directions, with the passage opening being opened from the center of the passage.

10. The roller band cassette as claimed in claim 9, wherein the housing further comprises an arrangement of lattice bars.

11. The roller band cassette as claimed in claim 1, further comprising a servomotor integrated into the drive shaft.

12. The roller band cassette as claimed in claim 1, wherein at least one of the return shaft and the drive shaft is sufficiently convex to avoid the roller band creasing.

13. A heating and/or air-conditioning system for use in a motor vehicle, comprising: at least one air passageway and a control device for controlling the flow of air through the passageway, wherein the control device comprises a roller band cassette as defined by claim 1.

14. A roller band cassette for use in a control device for controlling an air flow stream in a motor vehicle, comprising:
    a roller-band subassembly with a roller-type louver, which comprises a roller band, a drive shaft, and a return shaft,
    wherein the roller band comprises an endless band,
    wherein the drive shaft comprises at least two parts,
    wherein the roller band is held between the two parts of the drive shaft, and
    wherein the two parts of the drive shaft are manufactured integrally.

15. A roller band cassette for use in a control device for controlling an air flow stream in a motor vehicle, comprising:
    a roller-band subassembly with a roller-type louver, which comprises a roller band, a drive shaft, and a return shaft,
    wherein the roller band comprises an endless band,
    wherein the drive shaft comprises at least two parts,
    wherein the roller band is held between the two parts of the drive shaft, and
    wherein the roller band comprises a plurality of openings, and wherein each of the openings has at least one beveled edge.

* * * * *